United States Patent

[11] 3,624,290

[72] Inventor Judson A. Hofmann
Oak Park, Ill.

[21] Appl. No. 889,198
[22] Filed Dec. 30, 1969
[45] Patented Nov. 30, 1971
[73] Assignee Zenith Radio Corporation
Chicago, Ill.

[54] TELEVISION RECEIVER AGC SYSTEM KEYED IN RESPONSE TO TIME COINCIDENCE OF SYNC AND FLYBACK PULSES
15 Claims, 1 Drawing Fig.

[52] U.S. Cl. .......... 178/7.3 DC
[51] Int. Cl. .......... H04n 5/56
[50] Field of Search .......... 178/7.3 DC, 7.5 DC, 7.3 S, 7.5 S

[56] References Cited
UNITED STATES PATENTS

| | | | |
|---|---|---|---|
| 2,979,563 | 4/1961 | Kidd | 178/7.3 DC |
| 3,449,513 | 6/1969 | Jachim | 178/7.3 DC |

*Primary Examiner*—Robert L. Griffin
*Assistant Examiner*—John C. Martin
*Attorneys*—James E. Tracy and Francis W. Crotty

ABSTRACT: Under normal operating conditions a coincidence circuit produces keying pulses, for an AGC system of a television receiver, only when the flyback pulses from the receiver's horizontal sweep system occur concurrently with the horizontal sync components from the sync separator. The magnitude of the developed AGC voltage is held constant between keying pulses. This arrangement precludes sampling of video information, with a resulting false measure of received signal strength and an erroneous magnitude for the AGC voltage, which takes place in a conventional flyback pulse-keyed AGC system when the horizontal oscillator is out of synchronism with the sync pulses. During transient conditions, when there is a very fast and substantial increase or decrease in received signal strength causing a loss of sync pulses at the separator output, keying is achieved in the disclosed AGC system in response to the flyback pulses alone.

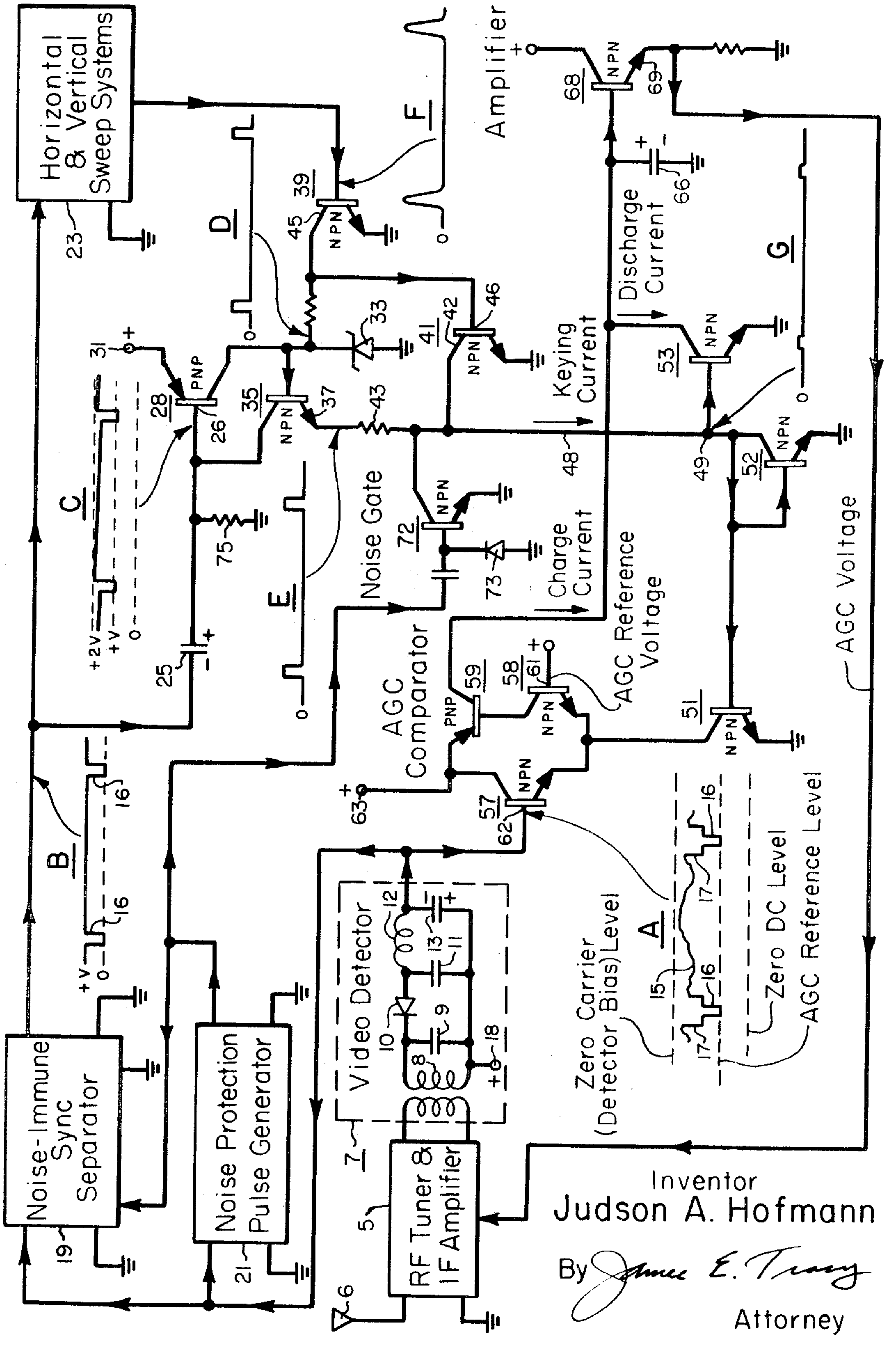
Inventor
Judson A. Hofmann
By James E. Tracy
Attorney

TELEVISION RECEIVER AGC SYSTEM KEYED IN RESPONSE TO TIME COINCIDENCE OF SYNC AND FLYBACK PULSES

BACKGROUND OF THE INVENTION

This invention pertains to a novel keyed AGC (or automatic gain control) system for a television receiver. More particularly, it relates to an arrangement for effectively scheduling the keying times to insure that the gain control action is always based on and determined by the actual signal strength of the received television signal.

The peak amplitudes of the horizontal synchronizing components of a composite video signal, derived by the video detector of a television receiver, are proportional to and therefore provide a measure of the signal strength of the received television signal. Any time the incoming signal strength varies, the amplitudes of the sync tips will do likewise. Since the sync peaks at the detector output accurately reflect the signal strength, most prior AGC systems for television receivers are keyed or gated to sample those peaks and from such samplings an AGC voltage is developed for regulating or adjusting the gain of the receiver inversely with received signal strength variations. The horizontal retrace or flyback voltage pulses, produced by the receiver's horizontal sweep output transformer and normally occuring in time coincidence with the horizontal sync pulses, are employed as keying pulses in these prior AGC systems.

Unfortunately, there will be occasions when the horizontal oscillator of the sweep system will fall out of step or synchronism with the sync pulses, and this will cause erroneous AGC action with a resultant disruption and distortion of the image reproduced by the receiver's picture tube. To explain further, nonsynchronous operation of the sweep system means that the flyback pulses, which now occur at a repetition frequency different from that of the sync pulses and are therefore no longer coincident in time with the sync pulses, will key the AGC system to sense or sample the video components whose instantaneous amplitudes are dependent on the scene being televised at the time and do not represent the incoming signal strength. During out-of-sync operation, the video signal samples will have amplitudes differing greatly from that of the sync pulses and will accordingly falsely indicate to the AGC voltage generator that a major change in gain is needed. From time to time, due to the beat or frequency difference between the repetition frequencies of the sync and flyback pulses, some of the flyback pulses will gate the AGC system during the occurrences of the sync components as a consequence of which the gain of the receiver will be correctly adjusted and the composite video signal at the detector output will be given the desired peak amplitude. Between beats, however, the gain will be established at values totally inconsistent with the true strength of the received television signal. With a relatively fast AGC system the composite video signal will be effectively amplitude-modulated and the sync separator will have large holes in its output which will inhibit the pulling in of the horizontal oscillator, thus prolonging the faulty AGC action. With a relatively slow AGC system the amplitude range covered by the composite video signal will usually be increased to an extent that sync separation may not occur.

The present invention overcomes this shortcoming of the prior flyback pulse-keyed AGC systems. Except under certain transient conditions, applicant's arrangement insures that only the sync components of the composite video signal will be sensed in the process of development an AGC voltage. Even though the horizontal oscillator may fall out of synchronization, video components will not be sampled by the AGC voltage generator.

Accordingly, it is an object of the present invention to provide a new and improved keyed AGC system for a television receiver.

It is another object to provide an AGC system which is keyed to sample the output signal of a video detector only when the instantaneous amplitude of that signal truly reflects the signal strength of the received television signal.

A further object is to provide a keyed AGC system for developing an AGC voltage whose magnitude is adjusted only when the AGC system is keyed, the magnitude being held constant between keying times.

An additional object is to provide a keyed AGC system that lends itself readily to circuit integration and may easily be reduced to a monolithic structure.

SUMMARY OF THE INVENTION

A keyed automatic gain control system, constructed in accordance with one aspect of the invention, for a television receiver comprises means for deriving, from a received television signal, a composite video signal having video components during spaced-apart horizontal trace intervals and horizontal sync components during intervening horizontal retrace intervals. A horizontal sweep system, controlled by the sync components, develops periodically recurring flyback pulses in time coincidence with the sync components when the operation of the sweep system is properly synchronized to those components. Coincidence means are provided for producing a keying pulse each time a flyback pulse occurs concurrently with a sync component. An AGC voltage generator, keyed by the keying pulses, develops an automatic gain control voltage having a magnitude determined by the peak amplitudes of those sync components that occur in the presence of flyback pulses. There are also means responsive to the automatic gain control voltage for regulating the gain of the receiver inversely with signal strength variations of the received television signal.

DESCRIPTION OF THE DRAWING

The features of the invention which are believed to be novel are set forth with particularity in the appended claims. The invention, together with further objects and advantages thereof, may best be understood, however, by reference to the following description in conjunction with the accompanying drawing containing a schematic diagram of a portion of a television receiver having a keyed AGC system constructed in accordance with one embodiment of the invention.

DESCRIPTION OF THE ILLUSTRATED EMBODIMENT

Turning now to the circuit diagram of the drawing, block 5 represents the combination of a conventional RF (or radio frequency) tuner of the superheterodyne type and an IF (or intermediate frequency) amplifier. A television signal received at the antenna 6 is converted to an IF signal which is then amplified in one or more IF amplifying stages. The amplified IF signal developed at the output of block 5 is supplied to a video or peak detector 7 which detects the composite video signal conveyed by the amplitude modulation components of the IF signal. The detector is of well-known construction, comprising a resonant circuit 8, 9 tuned to the middle of the IF band pass (usually around 45 megaHertz), a diode 10 and a low-pass filter 11-13. Diode 10 conducts only in response to the negative half-cycles of the IF signal and in so doing charges capacitor 13, with the indicated polarity, to the negative peaks in order to detect the negative envelope of the amplitude-modulated IF carrier. Hence, the composite video signal developed at the upper terminal of capacitor 13 will be of negative polarity, namely its sync components will be negative-going.

A very small portion of a typical composite video signal is shown by voltage waveform A which appears at the upper terminal of capacitor 13 with respect to the ground plane or zero voltage level of the receiver. The waveform merely illustrates two successive horizontal retrace intervals along with the intervening trace interval. Video components 15 are contained during the horizontal trace interval and horizontal synchronizing components 16 and blanking components 17 occur during the illustrated retrace intervals. Of course, although not shown in curve A, the composite video signal detected by detector 7 comprises during its vertical retrace intervals vertical blanking pulses, vertical sync pulses and equalizing pulses. For convenience, waveform A depicts a composite video signal derived from a received television signal representing a program transmitted in black-and-white or monochrome. The invention may, of course, be employed in connection with a color television signal.

It is assumed that the receiver is properly gain-controlled in accordance with the incoming signal strength, and thus the curve A signal will have the desired peak amplitude required to appropriately control the receiver's picture tube. As will be shown, the keyed AGC system, even in the presence of variations of the signal strength of the received television signal, operates to hold the sync tips (namely the peak amplitude of the sync components) to an AGC reference voltage level as indicated by a dashed construction line in curve A. For convenience, the zero carrier level has been shown in waveform A by the uppermost dashed construction line. That level, like the AGC reference level, will be the same regardless of signal strength. Thus, with appropriate AGC action the peak amplitude of each sync pulse, referenced to the zero carrier level, will be the same in spite of changes in signal strength at the input of the RF tuner.

Detector 7 is constructed so that the entire amplitude range covered by the composite video signal is substantially positive with respect to the ground or zero DC voltage level in the receiver, as evidenced by the lowermost dashed construction line associated with waveform A. This is achieved by means of the positive DC bias potential source 18 which effectively lifts the composite video from below (or negative with respect to) ground to substantially above or positive relative to ground. In the absence of any received signal whatsoever (noise or otherwise) at the input of the RF tuner, no IF carrier would be applied to detector 7 and thus its output voltage would be DC and of a magnitude essentially equal to the detector bias provided by positive DC source 18. For that reason, the dashed construction line in curve A designating the zero carrier level also indicates the detector bias level.

While no undesired impulse noise components have been included in the illustrated video signal, any such component would extend in the direction of the negative-going sync pulses 16 and to a peak amplitude substantially beyond the sync tip level, and may even extend to below the zero DC level.

The sync separation function for segregating the vertical and horizontal sync pulses from the remainder of the composite video signal is carried out by means of sync separator 19 which is made noise-immune by the effect of noise protection pulse generator 21. The specific composition of circuits 19 and 21 may take any of a variety of different forms to accomplish various degrees of immunity against noise. In accordance with one widely used approach, generator 21 constitutes an amplitude-sensitive noise separator for producing, in response to the portion of each noise component which extends beyond a predetermined noise threshold level (usually located close to but slightly beyond the sync tip level), a noise protection pulse which may then be employed at the input of the separator to cancel or subtract the noise component from the video signal. Alternatively, instead of deleting the noise components from the video signal prior to its application to the separator, the protection pulses may be utilized as noise-gating pulses to disable the sync separator itself during the occurrence of each such pulse. Preferably, circuits 19 and 21 take the construction shown in applicant's copending patent application Ser. No. 873,757, filed Nov. 5, 1969, and assigned to the same assignee as the present application. In accordance with the teachings in that copending application, materially greater immunity of the sync separation process against noise is obtained by stretching the output pulses of a threshold-biased noise separator to form broadened noise protection pulses which are then combined with the composite video signal, but after it has been delayed in a delay network, to cancel the noise components. In this way, each protection pulse is wide enough to effectively anticipate and embrace an associated noise component in order to remove the entirety of that component from the video signal. The vertical and horizontal sync components are separated after the video signal is made noise-free.

The horizontal sync pulses 16, separated from the curve A video signal, are shown by voltage waveform B. As is customary, separator 19 includes a threshold-biased amplifying device that remains cut off (and provides the output voltage +V as shown in curve B) until the instantaneous amplitude of the applied composite video signal reaches a predetermined sync clipping level at which time the amplifying device conducts. When the video signal has the desired peak amplitude (measured from or referenced to the zero carrier level) at the video detector output, the horizontal sync pulses will have a peak amplitude sufficient to drive the amplifying device to saturation and provide an essentially zero output voltage as also depicted in waveform B.

The separated horizontal and vertical sync pulses are delivered to the horizontal and vertical sweep or deflection systems, schematically shown merely by the single block 23, to properly control and synchronize the beam deflection process in the receiver's picture tube. The horizontal sweep system is of the conventional type, employing a free-running oscillator for controlling an output stage which in turn effects the development of a sawtooth-shaped current signal in a horizontal deflection yoke. The frequency and phase of the oscillator are precisely controlled by an automatic phase control circuit having a phase detector which compares the horizontal sync components with a signal derived and fed back from the horizontal output stage.

When the operation of the horizontal sweep system is properly synchronized to the horizontal sync components, the retrace or flyback portions of the sawtooth-shaped horizontal scanning signal occur in time coincidence with the sync components. In well-known fashion, the horizontal output transformer of the sweep system generates periodically recurring retrace or flyback voltage pulses in response to the retrace portions of the scanning current. Those flyback pulses therefore occur coincident in time with the sync pulses during periods of synchronous operation. Due to the fact that the horizontal sweep system is free-running, flyback pulses will be developed even in the absence of sync components applied to the input of the sweep system.

Attention will now be addressed to the coincidence means and the manner in which it produces keying or gating pulses for the AGC voltage generator. Clamp or coupling capacitor 25 charges, with the indicated polarity, to the peak-to-peak amplitude (namely V volts) of the periodically recurring horizontal synchronizing pulses 16 produced at the output of separator 19. The potential at base 26 of transistor 28 (shown by waveform C) is therefore at or close to twice the peak-to-peak amplitude (or +2V volts) during the trace interval between the negative-going sync pulses. The positive DC operating potential at terminal 31 is equal to +V volts. Hence, clamp capacitor 25 develops and maintains a bias voltage on transistor 28 to render it nonconductive or cut off between sync pulses. Each sync pulse, however, is translated through capacitor 25 and its leading edge causes the potential at base 26 to decrease until it is just slightly less than +V volts, whereupon the base-emitter junction of transistor 28 becomes forward biased to initiate collector current and to apply a positive-going voltage pulse to zener diode 33 of a magnitude sufficient to break it down so that it will produce a positive-going pulse (see voltage waveform D) of a predetermined, precise and regulated amplitude. For reasons to be appreciated later, the initial conduction of transistor 28 triggers a regenerative circuit into operation to guarantee that the transistor remains conductive until the output of separator 19 experiences a positive-going amplitude excursion. The regenerative action is provided by normally cut off transistor 35 whose base-emitter junction is forward biased by the collector current of transistor 28. The collector current of transistor 35 is drawn through the base-emitter junction of transistor 28 to make certain that the transistor remains ON until the arrival at base 26 of a positive-going amplitude variation.

As a result of the conduction of transistor 35 in response to and during the interval of each sync component, positive-going voltage pulses (waveform E) will be generated at emitter 37. Ignoring for the moment the effect of transistor 39, each positive-going pulse at the ungrounded terminal of diode 33 turns ON and saturates normally cut off transistor 41, the consequence of which is that collector 42 and thus the lower terminal of resistor 43 will be essentially established at ground potential. This causes the emitter current of transistor 35 to flow through resistor 43 and the collector-emitter conduction path of transistor 41 to ground.

The flyback voltage pulses are derived from the horizontal sweep system as positive-going pulses, as shown by voltage waveform F. In the event that the operation of the sweep system is out of sync with the horizontal sync pulses, most of the flyback pulses will not be coincident in time with the sync components and in that case the current from emitter 37 will still be steered to ground through the saturated transistor 41 as described before. When the sweep system is properly synchronized, however, each flyback pulse turns ON and saturates transistor 39 during the occurrence of a horizontal sync pulse. When that happens, collector 45 and consequently base 46 are essentially grounded and this prevents transistor 41 from conducting. Thus, when transistor 39 is ON transistor 41 will be OFF and the current from emitter 37 must flow through conductor 48 and into circuit junction 49. Therefore, current flows into junction 49 only when there is coincidence between sync and flyback pulses. While the disclosed coincidence circuit is more complex than a conventional coincidence circuit, it exhibits considerably lower power dissipation than a conventional circuit because bias currents flow only during sync and/or retrace intervals.

Each current pulse translated in conductor 48 effects keying or gating ON of applicant's AGC voltage generator. For that reason those pulses will constitute and be called the keying pulses. Each such current pulse effects forward biasing of the base-emitter junctions of the three normally cut off transistors 51, 52 and 53 to establish those transistors in their amplifying operating modes. Only transistors 51 and 53, which in a sense function as normally cut off gates, are actually needed to key the AGC system into operation. Transistor 52 is included to effectively regulate the collector currents of transistors 51 and 53 to maintain those currents constant (when the transistors are ON) in the presence of variations of transistor parameters.

To elucidate, it is contemplated that all of the circuits shown in detail (with the possible exception of detector 7) will be combined in and reduced to a single integrated circuit, preferably in monolithic form, and that transistors 51, 52 and 53 will be of identical construction. With identical parameters, each keying pulse effects equal base currents and equal collector currents. Since the base currents are very small, this means that the equal collector currents of transistors 51 and 53 will also be essentially equal to the keying current. Transistor 52 insures that those collector currents will remain equal to the keying current in spite of changes in transistor parameters. With the three transistors incorporated in the same integrated circuit, the parameters of all three will change simultaneously, but the base currents will adjust in order to maintain predetermined desired collector currents. For example, if the Betas of transistor 51-53 decrease, the three collector currents will tend to decrease. Inasmuch as the keying current is constant, a decrease in current flowing into the collector of transistor 52 means that more of the keying current must flow into the bases of transistors 51 and 53, the effect of which is to increase their collector currents back up to the desired magnitude.

The voltage signal appearing at circuit junction 49 is shown by waveform G. The voltage pulses at that junction are of very small amplitude since they are limited to the relatively small base-emitter voltage drop of each of transistors 51, 52 and 53.

In general, the AGC voltage generator includes a sampler (comprising a comparator, a hold capacitor, and charge-discharge circuitry for that capacitor) for sampling the composite video signal in response to and during the occurrence of each keying current pulse, each sample being retained (by the hold capacitor) until the next succeeding sample is taken. The hold capacitor produces the AGC voltage and this is applied to the RF tuner and IF amplifier which contain circuitry for responding to the AGC voltage to regulate the gain of the receiver inversely with received signal strength variations.

More specifically the comparator, comprising transistors 57, 58 and 59, is normally inoperative but is keyed into operation or enabled when transistor 51 conducts. At that time the instantaneous amplitude of the composite video signal is compared with an AGC reference voltage to effectively determine whether the composite video signal has the desired peak amplitude at the video detector output. Transistors 57 and 58 are connected to form a conventional differential amplifier in which an increase in collector current in one transistor causes a collector current decrease in the other. The AGC reference voltage applied to base 61 is essentially equal to the AGC reference amplitude level of the curve A video signal. Since transistor 51 is turned ON only during the occurrence of a sync pulse in coincidence with a flyback pulse, the relative conductions of transistors 57 and 58 will be dependent on the peak amplitude of the sync pulses of the composite video signal applied to base 62. If the sync tip potential is less positive than the reference voltage on base 61 by a predetermined minimum amount, transistor 57 will not conduct at all whereas transistor 58 will conduct heavily, the current flowing from positive DC source 63 through the emitter-base junction of transistor 59 and then through the collector-emitter conduction paths of transistors 58 and 51 to ground. On the other hand, when the sync peaks applied to base 62 have an amplitude more positive than the AGC reference voltage at base 61 by a prescribed minimum amount, transistor 57 conducts heavily while transistor 58 and 59 will remain cut off. Between those two extreme conditions, transistors 57 and 58 both conduct in amounts determined by the peak amplitudes of sync pulses 16.

Under the assumed conditions, the gains of the RF tuner and IF amplifier are commensurate with the incoming signal strength and the composite video signal at the detector output exhibits the desired peak amplitude, with respect to the zero carrier level, as evidenced in waveform A by the fact that the sync tips are established at the AGC reference level. Under those conditions it is merely necessary to maintain the AGC voltage at a constant magnitude. The hold capacitor, which develops the AGC voltage, is provided by capacitor 66. Its charge condition is adjustable only when the comparator is keyed. When no gain adjustment need be made, the charge on capacitor 66 will present a voltage, with the indicated polarity, of a suitable level which when applied to the base of transistor 68 produces at emitter 69 an AGC voltage of the required magnitude to maintain a constant video output at the detector. Transistor 68 in conjunction with its associated elements form a Class A operated current amplifier.

So long as there is no change in incoming signal strength, each time the AGC system is keyed both transistors 57 and 58 will conduct. The collector current of transistor 58, in flowing through the base-emitter junction of transistor 59, effects the translation of a controlled amount of collector current from transistor 59 to capacitor 66, which current tends to increase the charge on the capacitor. In the meantime, however, transistor 53 is also conductive and tends to discharge the capacitor. For constant gain or steady state conditions, the charge current flowing out of the collector of transistor 59 will be equal to the discharge current translated through transistor 53, which discharge current has a constant amplitude (equal to the keying current) regardless of the magnitude of the AGC voltage. The net result of the equal charge and discharge currents is that the charge on capacitor 66, and consequently the AGC voltage level, will remain unchanged in response to each keying pulse. Of course, between keying times both the charging and discharging circuits are open so there is no opportunity for the charge on hold capacitor 66 to vary. Unlike the conventional keyed AGC systems of the prior art, there is no bleeder resistor to permit decay of the AGC voltage when the system is not being keyed.

If the television signal picked up by antenna 6 increases in strength, the peak amplitude of the composite video signal at the video detector output increases and the peak amplitude of the sync components will fall below, namely become less positive relative to, the AGC reference level. As a consequence, when the AGC comparator is keyed there will be decreased collector current in transistor 57 and increased collector current in transistor 58 which in turn creates increased charge current delivered to capacitor 66 to increase its charge and hence the magnitude of the AGC voltage. This effects a gain reduction in the tuner and IF amplifying channel. If desired, the AGC voltage may be supplied directly to one or more stages of the IF channel but through an AGC delay circuit to the RF tuner so that gain reduction of the RF amplifier in the tuner occurs only after the received signal strength exceeds a predetermined level. Until that level is reached, the RF amplifier operates at full or maximum gain.

Decreased signal strength, on the other hand, results in the sync components applied to base 62 having a peak amplitude more positive than the reference voltage applied to base 61. Hence, during the occurrence of a sync pulse less collector current flows through transistor 58 to decrease the charge current supplied to capacitor 66. The constant discharge current will now be greater than the charge current and the capacitor will discharge during each keying interval until the magnitude of the AGC voltage decreases to the extent necessary to effect a gain increase in the amount required to once again provide the composite video signal with the desired peak amplitude at the video detector output and to set the sync tips at the AGC reference level.

In short, during normal operation of the AGC system the AGC voltage generator will be keyed only during the occurrences of the sync components. While the flyback pulses actually determine the keying times, unless those flyback pulses are in time-coincidence with the sync components the AGC system will not be keyed. If one of the sync pulses is not sampled, the AGC voltage will be held at the level determined by the last sync pulse sampled. There is thus no possibility of the AGC system sampling the video information and consequently producing an erroneous AGC voltage when the horizontal sweep system is out of sync with the sync pulses. Normal operation of the AGC system means that the amplitude range over which the composite video signal varies is appropriately related to the sync clipping amplitude level to permit separator 19 to strip off the sync pulses, and only the sync pulses, and to apply those stripped sync pulses to base 26 with an amplitude sufficient to turn transistor 28 ON. In other words, normal operation requires that separated sync pulses be supplied to the coincidence circuit and that the circuit operate to produce keying pulses in the manner previously described. As will be seen shortly, the AGC system operates in an entirely different manner during transient conditions when the strength of the incoming television signal abruptly changes from a very high to a very low level, or vice versa. In one case, a substantially zero IF carrier will manifest at the output of the IF amplifier while in the other case the IF amplifier will become overloaded. In either event, a DC voltage results at the video detector output and sync pulses no longer are produced by the separator.

It is to be noted that under steady state conditions the comparator is required to charge the hold capacitor at a constant rate (namely the discharge rate) and that this rate is fixed regardless of the magnitude of the AGC voltage on the capacitor. This means that the voltage difference or offset between the sync level at base 62 and the AGC reference voltage at base 61 required to hold a specific AGC voltage magnitude will be constant and independent of that magnitude. For steady state conditions the AGC loop gain, as indicated by the relatively small amount of voltage offset between bases 62 and 61 necessary to establish a receiver gain that is commensurate with the incoming signal strength, will be very high and constant for all values of the AGC voltage. By the same token, the required relatively small offset in applicant's system will be constant regardless of the received signal strength.

This is not true in prior keyed AGC systems where the amount of charging current for the AGC capacitor under steady state conditions is directly proportional to the magnitude of the AGC potential across that capacitor and where the offset voltage varies with received signal strength variations. In those systems a bleeder resistance is required across the capacitor in order to provide it with a discharge path. The higher the steady state AGC voltage on that capacitor, the greater will be the discharge current through the bleeder resistance between keying times and that discharge current must be replaced by the AGC charging system during each keying interval. Hence, the greater the steady state AGC voltage, the greater will be the charging current when the AGC system is keyed and this higher charging current requires a larger offset between the sync tip level and an AGC reference voltage at the comparison point in the charging system.

In the disclosed system, the speed of the AGC loop (or slew rate of hold capacitor 66) is a variable which can be adjusted without changing the loop gain. The speed may be changed merely by altering the electrical size of capacitor 66 and this will not vary the offset required at the comparator since the discharge current has not been changed.

Although the sync pulses delivered by separator 19 to the AGC system are substantially noise-free during normal operation, it is desirable to disable or lock off that system in the presence of noise. Otherwise, if a noise component occurred simultaneously with a sync pulse at the video detector output a grossly incorrect sample would be taken by the AGC voltage generator, manifesting in a magnitude for the AGC voltage totally inconsistent with the true strength of the received television signal. For that reason normally cut off transistor 72, which serves as a noise gate, has been incorporated in the illustrated AGC system. The noise protection pulses, produced in response to the noise components, are applied to the base of transistor 72 as positive-going pulses of sufficient magnitude to turn ON and saturate the transistor. Thus, during the presence of noise the lower terminal of resistor 43 will be essentially grounded to prevent any keying current pulses from enabling the AGC voltage generator. Diode 73 is included to clamp the AC-coupled noise protection pulses to ground at the base of transistor 72.

As thus far described, the coincidence circuit must be supplied with both horizontal sync components from separator 19 and flyback pulses from the horizontal sweep system. In the absence of either one of those signals, keying pulses would not be delivered to transistors 51, 52 and 53 and the AGC comparator would be unable to sample or take a look at the output signal of the video detector. Since the sweep system is free running, flyback pulses will always be available but this is not true with respect to the sync pulses. When the incoming signal strength increases or decreases so quickly that the AGC system is unable to compensate, it may not be possible for separator 19 to produce the sync pulses.

To explain, loss of sync pulses at the separator output is caused by overloading of the receiver which could occur when the received signal strength at the input of the RF tuner suddenly increases from a very low to a very high level, as would be the case in the event the television receiver is tuned from a very weak to a very strong channel. During the reception of the very weak television signal, the AGC action will establish the receiver in its maximum or full gain operating mode. With the receiver operating at maximum gain when the television set is switched to the strong channel, the IF signal applied to the last IF amplifying stage very likely would have a peak-to-peak amplitude capable of driving that stage between saturation and cutoff during each carrier cycle, with the result that the IF signal supplied to the video detector would be essentially a square wave having a very large peak-to-peak amplitude but having no amplitude modulations and therefore bearing no video information.

Capacitor 13 of detector 7 charges to the peak amplitude of each negative half cycle of the square wave and retains that charge from one negative peak to the next. Since all of the negative half cycles have the same, very large peak amplitude, a highimagnitude DC voltage with the indicated polarity will be developed across capacitor 13. A DC voltage would therefore be produced at the output of the video detector. The capacitor voltage may very likely exceed the potential of DC source 18, in which case a negative DC voltage will manifest at the output of detector 7.

In the absence of sync pulses at the video detector output, separator 19 obviously cannot supply any negative-going pulses to base 26 of transistor 28 to turn that transistor ON. A DC voltage only will be found at the output of the separator. In the absence of noise protection, the DC output voltage from the video detector would likely be substantially above the sync clipping level and therefore would drive the separator into saturation. With the noise protection, the detector output voltage would be above the noise threshold level as a consequence of which the separator would be disabled. In either event, the output of separator 19 will be DC. If the overloading merely crushes the amplitude modulations of the IF signal supplied to detector 7, a DC voltage will probably still be produced at the separator output. The crushed video developed at the detector output will swing over a relatively narrow amplitude range but the entirety of that range would likely be above both the sync clipping and noise threshold levels, resulting in a DC output voltage at the separator.

Unless the AGC voltage generator is permitted to sample the DC voltage at the output of the video detector during overload conditions, the charge on capacitor 66 will remain unchanged and the receiver will continue to operate at full gain. The requirement of a resumption of keying, when periodically recurring sync pulses no longer appear at the separator output, is satisfied by clamp or coupling capacitor 25 and the regenerative circuit built into the coincidence means. As shown by waveforms B and C, under normal operating conditions at the termination of each sync pulse the voltage across capacitor 25 is equal to V volts and the right terminal of that capacitor is established at +2 V volts. As is also evident in curve C during the interval from the trailing edge of one sync pulse to the leading edge of the next, capacitor 25 partially discharges through resistor 75. The discharge time constant is chosen so that once capacitor 25 has been charged to V volts by a sync pulse, at least the next four successive sync components must be missing in order to allow the capacitor to fully discharge and then to charge slightly in the opposite direction so that its right terminal becomes less than (or negative relative to) +V volts, the potential of source 31. When that happens, transistor 28 becomes forward-biased and conducts, thereby turning transistor 35 ON which insures that transistor 28 remains ON until a positive-going amplitude excursion is translated through capacitor 25 to base 26. Thus, once the receiver becomes overloaded and locks off the keying pulse generator, a minimum of only four horizontal traces are required to turn transistor 28 ON and keep it ON.

Assuming that transistors 28 and 35 are triggered into conduction at some instant between the occurrences of flyback pulses from the free-running sweep system, the positive voltage appearing at the ungrounded terminal of diode 33 will effect saturation of transistor 41 to divert the emitter current of transistor 35 to ground through the collector-emitter conduction path of transistor 41. Upon the occurrence of a flyback voltage pulse, transistor 39 becomes saturated and transistor 41 cuts off with the result that a keying current pulse, of the width of the flyback pulse, is supplied via conductor 48 to transistors 51, 52 and 53 to gate the sampler into operation. The detector output potential applied to base 62, being substantially less positive than the voltage at base 61, results in a considerable amount of charge current translated to capacitor 66 to initiate a gain reduction in the receiver. Several successive flyback pulses may be needed to key the AGC voltage generator in order to supply enough charge current to capacitor 66 to charge it to the extent necessary to reduce the gain in the amount required to cause the composite video signal to vary within an amplitude range appropriately related to the sync clipping level to allow separator 19 to begin supplying separated sync pulses to base 26. The AGC system then operates normally and the receiver gain will eventually be adjusted to that essential to provide the composite video signal with the desired peak amplitude and, moreover, to establish the sync tips at the AGC reference level.

On the other hand when the television receiver is tuned from a very strong to a very weak television channel, sync pulses will also be lost at the separator output and the application of keying pulses to the AGC voltage generator will be temporarily halted. This is because the receiver will be operating at minimum gain at the instant the weak television signal is applied to the tuner, with the result that the composite video signal produced by the detector 7 will have a very small peak amplitude and at a level relatively close to the zero carrier or detector bias level. Under those circumstances, the sync tips will be well below the sync clipping level and thus will not actuate the separator. However, as in the case of overload conditions, the absence of at least four successive sync pulses at the separator output results in turning ON of transistor 28 and the delivery of flyback pulses to the AGC system to effect keying. Since the voltage applied to base 62 at that time will be substantially more positive than the AGC reference voltage, no charge current will be supplied (via transistor 59) to capacitor 66 and it will discharge through transistor 53 in increments in response to the flyback keying pulses until the gain is increased in the amount required to effect normal operation of the AGC system.

Of course, other arrangements may be employed to facilitate keying of the AGC system in the event that the sync pulses disappear at the output of the sync separator. Although in the illustrated embodiment the threshold-biased amplifying device in the separator remains cut off except during the intervals of the sync pulses at which time it is fully conductive and saturated, the separator may be designed to relax to its saturated condition in response to the absence of at least four successive sync pulses. Coupling capacitor 25 and the regenerative circuit would then be unnecessary.

The invention provides, therefore, a novel arrangement for controlling the keying times of an AGC system so that the gain control action is always determined by the true signal strength of the received television signal, regardless of whether the AGC system if functioning normally or under transient conditions.

While a particular embodiment of the invention has been shown and described, modifications may be made, and it is intended in the appended claims to cover all such modifications as may fall within the true spirit and scope of the invention.

I claim:

1. A keyed automatic gain control system for a television receiver comprising:

means for deriving, from a received television signal, a composite video signal having video components during spaced-apart horizontal trace intervals and horizontal sync components during intervening horizontal retrace intervals;

a horizontal sweep system controlled by said sync components and developing periodically recurring flyback pulses in time coincidence with said sync components when the operation of said sweep system is properly synchronized to said components;

coincidence means for producing a keying pulse each time a flyback pulse occurs concurrently with a sync component;

an AGC voltage generator, keyed by the keying pulses, for developing an automatic gain control voltage having a magnitude determined by the peak amplitudes of those sync components that occur in the presence of flyback pulses;

and means responsive to said automatic gain control voltage for regulating the gain of said receiver inversely with signal strength variations of the received television signal.

2. A keyed automatic gain control system according to claim 1 in which said AGC voltage generator includes a sampler for sampling said composite video signal in response to and during the occurrence of each keying pulse, and in which each sample is held until the next succeeding sample is taken.

3. A keyed automatic gain control system according to claim 1 wherein said AGC voltage generator includes a comparator which, in response to each keying pulse, compares the peak amplitude of the simultaneously occurring sync component with an AGC reference voltage to effectively determine whether said composite video signal has a desired peak amplitude, said AGC voltage generator utilizing such comparisons to control the magnitude of said automatic gain control voltage in order to establish and maintain said composite video signal at said desired peak amplitude and to establish and maintain the peak amplitude of said sync components at a predetermined AGC reference level.

4. A keyed automatic gain control system according to claim 1 in which said automatic gain control voltage is developed by a capacitor whose charge condition may be changed, thereby to vary the magnitude of said control voltage, only during the occurrence of a keying pulse.

5. A keyed automatic gain control system according to claim 1 in which said AGC voltage generator includes a capacitor for developing said automatic gain control voltage; and charging-discharging means, normally inoperative but keyed into operation by said keying pulses, for controlling the charge on said capacitor; and in which the charge condition of said capacitor is adjustable only when said charging-discharging means is made operable.

6. A keyed automatic gain control system according to claim 1 in which said AGC voltage generator includes a capacitor for developing said automatic gain control voltage, a charging circuit for charging said capacitor, and a discharging circuit for discharging said capacitor, and in which a controlled amount of current is translated through at least one of said circuits during the occurrence of a keying pulse when it is necessary to adjust the charge condition of said capacitor to reflect a change in the signal strength of the received television signal.

7. A keyed automatic gain control system according to claim 1 in which said AGC voltage generator includes a normally inoperative comparator for comparing the instantaneous amplitude of said composite video signal with an AGC reference voltage to effectively measure the peak amplitude of said composite video signal, a capacitor for developing said automatic gain control voltage, and normally inoperative charge-discharge circuitry to be controlled by said comparator to adjust the charge condition of said capacitor in accordance with variations of the amplitude of said composite video signal from a desired peak amplitude, and in which said comparator and said charge-discharge circuitry are rendered operative in response to each keying pulse.

8. A keyed automatic gain control system according to claim 7 wherein normally cut off gates, included in said comparator and in said charge-discharge circuitry, are rendered conductive by each keying pulse.

9. A keyed automatic gain control system according to claim 1 and including immunizing means for rendering said system immune to undesired noise components that may be included in said composite video signal.

10. A keyed automatic gain control system according to claim 1 and including means, effectively responsive to a sudden and substantial change in received signal strength, for developing for application to said AGC voltage generator keying pulses that are independent of, and not necessarily in time coincidence with, said sync components.

11. A keyed automatic gain control system according to claim 1 in which said sync components are normally separated from said composite video signal and applied to both said horizontal sweep system and to said coincidence means, and wherein said sweep system is free-running and develops flyback pulses even in the absence of applied sync components; and including means, responsive to the absence of sync components applied to said coincidence means, for keying said AGC voltage generator with the flyback pulses alone.

12. A keyed automatic gain control system according to claim 1 wherein a clamp capacitor, which charges in response to said sync components, develops and maintains a bias voltage on said coincidence means in order that the keying pulses are normally produced only when the flyback pulses sync in time coincidence with the sync components; said capacitor discharging to remove said bias voltage in response to the absence of a minimum number of successive sync components; and said coincidence means, in the absence of said bias voltage and in response to the flyback pulses, producing output pulses for keying said AGC voltage generator.

13. A keyed gain control system according to claim 1 in which both said coincidence means and said AGC voltage generator are inductorless and lend themselves readily to circuit integration.

14. A keyed automatic gain control system for a television receiver comprising:

- means for deriving a composite video signal having video and horizontal sync components;
- a separator for separating said sync components from said composite video signal;
- a free-running horizontal sweep system normally controlled by the sync components from said separator and developing periodically recurring flyback pulses;
- a keyed AGC voltage generator for developing an automatic gain control voltage having a magnitude determined by the instantaneous amplitude of said composite video signal at the keying times of said generator;
- means for keying said AGC voltage generator in response to the time coincidence of the flyback pulses and the sync components, during normal operation when sync components are present at the output of said separator, and in response to the flyback pulses alone during transient conditions when there is a rapid and considerable change in received signal strength resulting in an absence of sync components at the output of said separator;
- and means responsive to said automatic gain control voltage for regulating the gain of said receiver.

15. A keyed automatic gain control system for a television receiver comprising:

- means for deriving, from a received television signal, a composite video signal having video and horizontal sync components;
- a free-running horizontal sweep system the operation of which is to be synchronized to said sync components;
- a keyed AGC voltage generator for developing an automatic gain control voltage having a magnitude determined by the instantaneous amplitude of said composite video signal at the keying times of said generator;
- means, effectively operative when the peak amplitude of said composite video signal lies within a predetermined amplitude range, for keying said AGC voltage generator only during the occurrences of said sync components even though said sweep system may from time to time be out of synchronization with said sync components;
- and means responsive to said automatic gain control voltage for regulating the gain of said receiver inversely with signal strength variations of the received television signal.

* * * * *